United States Patent [19]

Cosmi

[11] 4,235,578
[45] Nov. 25, 1980

[54] PROVOLONE CHEESE MOLDING APPARATUS AND MOLD ASSEMBLY THEREFOR

[75] Inventor: Vincent Cosmi, Hagerstown, Md.

[73] Assignee: Dari-Desserts, Inc., Richmond, Vt.

[21] Appl. No.: 939,041

[22] Filed: Sep. 1, 1978

[51] Int. Cl.$^3$ ............................................. B29J 1/00
[52] U.S. Cl. .................................. 425/173; 249/134; 425/172; 425/261; 425/357; 425/359; 425/575
[58] Field of Search ............... 425/444, 575, 357, 359, 425/261, 172, 173; 249/134

[56] References Cited

U.S. PATENT DOCUMENTS

| | | | |
|---|---|---|---|
| 3,421,220 | 1/1969 | Stanga | 425/172 |
| 3,759,478 | 9/1973 | Schmitt | 249/134 |

FOREIGN PATENT DOCUMENTS 2403350  7/1975  Fed. Rep. of Germany ........... 425/439

OTHER PUBLICATIONS

Stainless Steel Fabricating, Inc., Beaver Dam, Wis., Brochure "Italian Cheese Molding Machine".

*Primary Examiner*—James H. Derrington
*Attorney, Agent, or Firm*—Sughrue, Rothwell, Mion, Zinn and Macpeak

[57] ABSTRACT

A provolone cheese molding apparatus constituted by a fixed, horizontal table having a single circular hole within the table, a chute depending from the table and aligned with the circular hole, and means for pressing warm cheese upwardly within the chute. A slide on the upper face of the table reciprocates horizontally and includes spaced circular holes within the slide for selective alignment with the table holes. Cylindrical provolone cheese loaf forming tubes are vertically mounted to the slide coaxial with the holes and receive the cheese when aligned with the chute to form cylindrical provolone cheese loaves. The tubes are formed of lightweight light transmitting plastic, and each bears a plunger disc of a light contrasting color which moves with the cheese as it rises internally of the tube to indicate the extent of filling of the tube. The slide is shifted relative to the table and releasable clamping means are operated to release a filled tube which is then inverted with the plunger disc in place, and placed in a water cooling tank for cooling and solidifying the cheese loaf.

10 Claims, 9 Drawing Figures

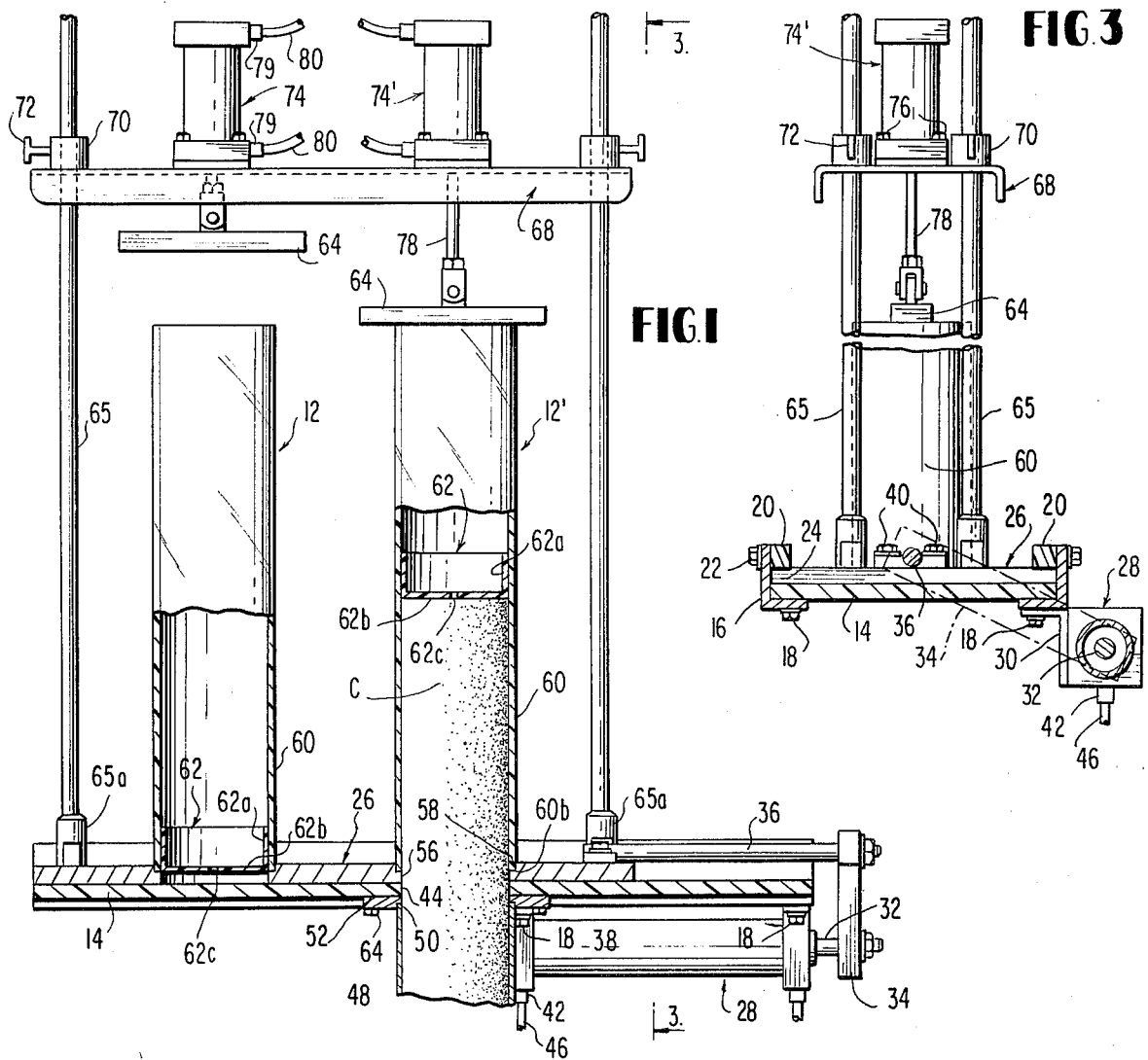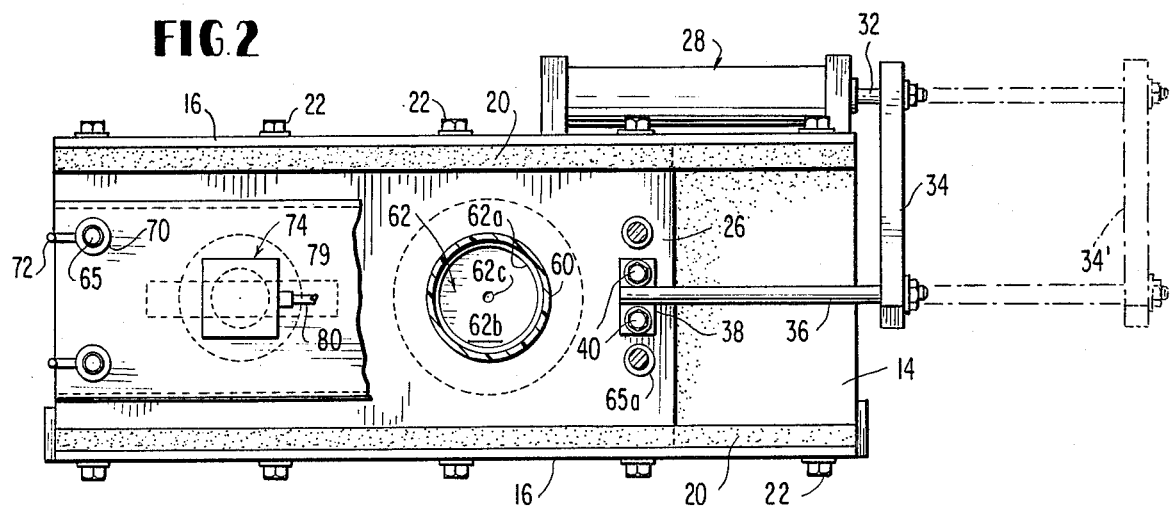

PROVOLONE CHEESE MOLDING APPARATUS AND MOLD ASSEMBLY THEREFOR

BACKGROUND OF THE INVENTION

1. Field of the Invention

This invention relates to the manufacture of Italian cheese and, more particularly, to an improved provolone cheese molding apparatus and mold assembly therefor for forming individual hot provolone cheese loaves and facilitating the cooling of the same.

2. Description of the Prior Art

Italian cheese such as provolone cheese, during its manufacture, is extruded from a cheese-making machine which both mixes and stretches the cheese, under heat, prior to its extrusion. At the time of extrusion, the cheese is quite warm, well above room temperature, and the cheese must be molded into individual loaf form and cooled. The loaves may be of different sizes, but generally, constitute several pounds of cheese and are in somewhat the shape of loaves of bread.

In that regard, in the manufacture of provolone cheese, it is conventional to employ a machine or apparatus for forming loaves of uniform size, the machine or apparatus being constituted by a horizontal, fixed table bearing on its upper face or surface, a reciprocating slide constituted by a plate-like member which reciprocates horizontally and is guided at opposed edges by suitable slots within guide means fixed to the edges of the table. The slide is provided with a transverse row of circular holes or openings spaced laterally from each other. In one conventional machine of which this invention constitutes an improvement, the table bears three equal diameter holes in a lateral row, the center hole of which is aligned with a depending tube or chute through which the hot cheese, after extrusion from the extruder, is forced vertically upward for vertical ejection through the center hole of the table. To the left and right of the center hole and the vertical chute through which the cheese is forced under pressure, there are provided depending inclined chutes which open at their lower end and are provided with a horizontally and forwardly directed loaf discharge surface. Further, the conventional slide bears a pair of circular holes which are alignable with given one of the holes of the table, and fixed to the slide are metal cylindrical tubes formed of stainless steel or the like having internal diameters on the order of the holes within the slide and those holes within the table. The ends of the metal tubes are open, and, during the filling of the tubes by cheese moving vertically upward within the center opening of the table when a given one of the tubes is coaxially positioned with respect to that opening, permits to some degree the viewing of the interior of the cylinder. During the filling of a given metal tube when it is centered with respect to the central table opening, the operator permits the warm cheese to rise vertically upward until the end of the cheese appears above the open end of the metal tube being filled, whereupon the operator of the machine terminates the filling operation and shifts the slide transverse to the extent that the adjacent unfilled metal tube is now coaxial with the center opening of the table and in alignment with the chute through which the warm cheese passes from the extruder, while the previously filled tube moves into vertical alignment with a laterally offset hole within the table and one of the two discharge chutes to opposite sides of the filling chute bearing the warm cheese. Cheese is discharged by gravity flow from the metal tube taking the form of a cylindrical loaf which then is transferred manually to an appropriate pan, similar to a baking pan, for holding the loaf and permitting the loaves to be submerged within cooling water within an appropriate tank to the side of the machine for cooling and solidification of the cheese.

Such conventional apparatus provides a number of problems. First, since the operator must either peer over the top of the open tube or in some other fashion sense the level of the cheese at or near the top of the opaque stainless steel tube, the measurement of the loaf being formed in terms of mass content of cheese is hardly precise, and the loaves obviously vary in size. Secondly, in this type of apparatus, additional manual steps are necessary for insuring the removal of the cheese from the filled tube, during filling of the unfilled tube, and the placement of the loaf within an appropriate pan for emerging within the cooling water.

In an attempt to reduce the time of forming of the provolone Italian cheese loaves for cooling and solidification and in an attempt to reduce the manual operation in achieving that end, the conventional machine was modified to the extent where the stainless steel tubes were permitted to be removed from the molding apparatus once the cheese filled those tubes to the top or upon slightly overfilling the top of the open tube, in which case, the filled tube was simply picked up manually and placed upright in a body of cooling water, with the tubes constituting vertical columns and rows within a rectangular water-filled open-top tank. It was determined that not only did the cheese tend to fall back out of the open bottom tube but the tubes were difficult to transport since the stainless steel tubes were quite heavy. Further, steel tubes are not only costly but, invariably, the tubes are banged about, resulting in denting of the tubes or bending of the same, which makes removal of the cheese subsequent to cooling and solidification additionally difficult and in some cases impossible. In a further attempt to employ the stainless steel tubes, the interior of the steel tubes were coated whit Teflon to reduce friction and to permit the cheese to slide out after cooling. While this alleviated one of the problems, the Teflon coating additionally increased the cost of the steel tube, and another problem remains of not being sure of the exact level of the cheese due to the opaque nature of the stainless steel tube.

SUMMARY OF THE INVENTION

The present invention is directed to an improved provolone cheese molding apparatus and the mold assembly therefor. The improvement is directed to a molding apparatus of the type including a fixed, horizontal table having at least one circular hole within the table and including a chute depending from the table and aligned with the hole and having means for pressing warm provolone cheese upwardly within the chute for discharge vertically upwards from the table opening. Such apparatus further includes a slide mounted on the table for horizontal reciprocating movement over the top of the table with the slide being provided with a row of laterally spaced circular holes within the slide permitting selective alignment of the holes within the slide with those holes within the table top as the slide is shifted transversely relative to the table. Cheese loaf forming tubes are vertically mounted to the slide and coaxial with the holes for receiving the cheese being discharged upwardly from the table opening to form a cylindrical loaf conforming to the interior of the tube. The improvement resides in the table having a single hole for permitting upward discharge only of the warm provolone cheese into a given tube, the tubes being formed of a lightweight light transmitting material, and each including a plunger disc movable axially within the same and being pressed upwardly by the cheese and being formed of light contrasting color and having a diameter on the order of the inner diameter of the tube such that the plunger disc visually defines the extent of the cheese movement in filling the tube and effects a flat end to the formed loaf.

The apparatus further comprises means for releasably clamping the tube downwardly against the slot during tube filling and lateral shifting of the slide such that the tubes are uniformly filled to the same degree with provolone cheese and to the extent indicated by the rise of the color contrasting plunger within the light transmitting tube to the tube top, and upon release of the filled tube, the tube may be manually grasped and inverted to retain the cheese within the tube and prevent loss of cheese from the tube as the tube is vertically immersed within the cooling tank with the plunger in contact with the tank bottom.

Preferably, the tube is formed of translucent plastic, and the disc is of cup-shaped configuration with a flanged periphery which projects upwardly and permits the manual grasping of the disc upon release of the filled tube to facilitate inversion of the tube, transport of the filled tube to the cooling tank, and facilitates water contact against the bottom of the filled tube to effect uniform cooling of the formed provolone cheese loaf. The means for releasably clamping the tubes downwardly against the slide may comprise a plurality of vertical support rods fixedly mounted to the slide and projecting vertically upwardly, a horizontal tube locking head vertically slidably mounted on the vertical support rods and being clamped at a predetermined vertical position above the slide, with the tube locking head bearing hydraulic cylinders corresponding to the number of tubes carried by the slide and being aligned with the slide openings. Each hydraulic cylinder, includes a vertically displaceable shaft projecting downwardly from the hydraulic cylinder and bearing at its lower end a transverse fixing plate of a width in excess of that of the tube and contacting the upper ends of the tube to maintain each tube against the slide under hydraulic pressure. Preferably, a further, horizontal hydraulic cylinder is fixedly mounted to one side of the table with a transversely displaceable shaft coupled to the slide such that, by expansion and retraction of the hydraulic cylinder shaft, the slide is shifted horizontally on the table between positions in which the tubes are selectively alignable vertically with the opening within the table through which the hot provolone cheese is discharged for filling of the tube.

BRIEF DESCRIPTION OF THE DRAWINGS

FIG. 1 is a front elevational view, partially in section, of the improved provolone cheese molding apparatus utilizing two mold assemblies, forming a preferred embodiment of the present invention.

FIG. 2 is a top plan view of the apparatus and mold assemblies of FIG. 1 partially broken away.

FIG. 3 is a vertical end view of the apparatus and mold assemblies of FIG. 1.

DESCRIPTION OF THE PREFERRED EMBODIMENT

Figure 4A:
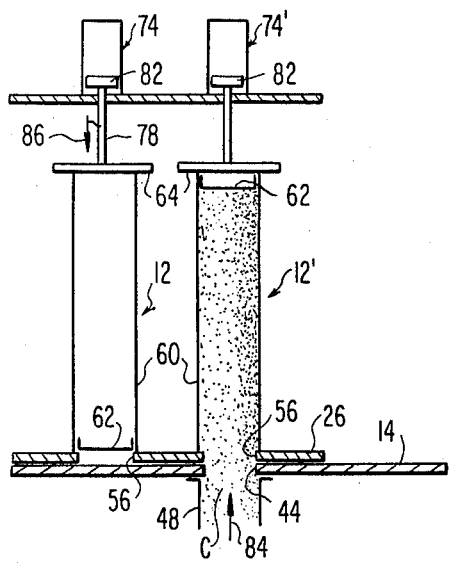
FIGS. 4a-4f inclusive are schematic views of the apparatus and mold assemblies of the present invention in a sequence of filling of the loaf forming tubes and transport to the provolone cheese cooling tank.

By reference to FIGS. 1-3 inclusive of the drawings, a preferred embodiment of the present invention may be seen comprising essentially two parts—that is, the improved provolone cheese molding apparatus indicated generally at 10 and a pair of specially formed mold assemblies as at 12 and 12', respectively, at left and right in the front view of FIG. 1 of that apparatus. In that regard, the apparatus 10 comprises a horizontal fixed table 14 which is supported appropriately by legs (not shown) and may be formed of plastic as indicated, although, alternatively, the table 14 may be formed of sheet metal. The table 14 has fixed to each side thereof (FIG. 3) L-shaped guides 16 which are bolted to the table 14 at the front and rear by bolts 18. Additionally, the L-shaped guides 16 have mounted at their upper ends and on their inside surfaces rectangular plastic bars 20 by means of screws or bolts 22. The bars 20 may be formed of a suitable plastic and define with table 14, guide slots 24 at the front and rear of the table 14. The ends of the table are open, and positioned within the opposed slots 24 are the front and rear edges of a slide indicated generally at 26, the slide taking the form of a metal plate which is permitted to reciprocate transversely—that is, shift to the left and right (FIG. 1) between extreme positions. In order to effect this reciprocation, the table 14 is provided with a horizontally orientated hydraulic cylinder or linear motor indicated generally at 28 which is fixed to the table by means of depending L-shaped brackets 30 which are mounted to the table by way of the bolts 18, also used to mount the rear guide 16 to that table. The hydraulic cylinder or linear motor 28 is provided internally with a piston (not shown) fixed to a shaft 32 which projects from one end of the hydraulic cylinder, the shaft 32 bearing a cross-head 34 which extends obliquely (FIG. 3) and has fixed at its opposite end, a drive shaft 36 which extends parallel to the shaft 32. In turn, shaft 36 is fixed at its opposite end to bar 38, the bar being mounted by way of screws 40 to the slide 26. Appropriately, hydraulic fittings 42 at respective ends of the hydraulic cylinder 28 permit hydraulic fluid to be directed to one side or the other of the piston (not shown) internally of the hydraulic cylinder 28 so as to shift the shaft or rod 32 to the right or left (FIG. 1) and to position the slide 26 between extreme positions in which either mold assembly 12 or 12' is in vertical axial alignment with a single circular opening or hole 44 within table 14. The hydraulic fluid is directed to the hydraulic cylinder through appropriate tubing as at 46 for respective fittings 42. The opening or hole 44 permits the vertical upward discharge of hot cheese C which moves upwardly within a cylindrical tube or chute 48 which may be formed of metal or the like and whose open upper end 48a is received within an annular recess 50, formed within an annular collar 52 which is mounted to the bottom of the table 14 by way of screws 54. The internal diameter of the tube 48 conforms to the diameter of the opening or hole 44 within table 14.

The slide 26 is provided with paired holes, as at 56, for mold assemblies 12 and 12', these holes being of equal diameter and also of the same diameter as the interior of tube 48 and the diameter of the opening or hole 44 within table 14. The slide 26 bears annular recesses 58 for the holes 56 which are of a radius on the order of the thickness of tubes or cylinders 60 received thereby and forming one element of a two-part mold assembly comprised additionally of a cup-shaped indicating a plunger or cap 62, the cap or plunger not being shown for assembly 12 in FIG. 1.

The mold assemblies 12 and 12' of the present invention are an important aspect of the present invention, and the cylinders or tubes 60 are formed of light transmitting material, preferably high density polyethylene, and, in the case of the illustrated embodiment, being white and translucent. The indicating plunger or cap 62 is also formed of a high density polyethylene or other lightweight contrasting color material, preferably plastic and of a contrasting color to that of the light transmitting plastic tube or cylinder 60. The cap 62 comprises a cylindrical side wall 62a and a transverse end or bottom wall 62b, with the end wall including a small diameter opening or hole 62c within the center of the same. The hole 62c permits any air to escape which might otherwise be trapped within the cylinder or tube 60 during the filling of the cheese C within the same as indicated appropriately in FIG. 1. The side wall 62a not only permits the operator to grasp the upper peripheral edge of the tube 60, and with the fingers of the operator entering the interior of the cap subsequent to filling of the same to the extent permitted by the tube fixing plate 64 in contact with upper edge 60a of the tube or cylinder 60 is positioned with the recess 58 and against a shoulder of the slide formed by that recess, but the extent of the rise of the cap and the progression in filling of the cheese may be readily monitored visually by the operator facing the tube 60 aligned with the cheese filling chute 48 and the single opening or hole 44 within the table 14 during the filling operation.

A further important aspect of the present invention resides in the means for releasably fixing or clamping the tubes 60 against the shoulder 26b formed by the recesses 58 when a tube 60 is mounted to the slide and aligned with hole 44 within table 14. In the illustrated embodiment, paired support rods 64 are fixedly mounted to the face 26a of the slide 26 on each side of the longitudinal center line defined by the axes of holes 56. The lower ends of the rod 64 are mounted to the slide 26 by enlarged collars 64a. The four rods 64 project through respective circular holes 66 within a metal plate, tube locking head 68 which extends horizontally so as to overly slide 26. In this respect, the support rods 64 bear mounting rings 70, each provided with a threaded locking screw 72 which project through its ring and fictionally locks each ring 70 axially on its rod 64. The rings are welded or otherwise fixed to the upper surface of the tube locking head 68, thus permitting the tube locking head to be located vertically above the slide 26 but fixed with respect thereto at a predetermined distance therefrom. Mounted to the head 68 are a pair of hydraulic cylinders indicated generally at 74, the hydraulic cylinders being vertically oriented and being mounted to the upper surface of the head 68 by way of bolts as at 76. The hydraulic cylinders 74 are conventional and are provided internally with pistons 82 (FIG. 4A) which reciprocate between extreme positions. Each piston 82 is coupled to a rod or shaft 78 which projects downwardly through the tube locking head 68 and supports on its lower end a tube fixing plate 64, in each instance. Thus, the tube fixing plate 64 may reciprocate vertically between extreme positions as indicated between a raised position (FIG. 1) for the left-hand hydraulic cylinder 74 overlying mold assembly 12 and a projected or lower position and in contact with the upper end 60a of tube or cylinder 60 for assembly 12'.

While the extent of vertical shifting of the tube fixing plates 64 for hydraulic cylinders 74 and 74' may be appreciated by reference to FIG. 1, the extent of horizontal reciprocation or shifting of the slide 26 with respect to the fixed table 14 may be appreciated by reference to FIG. 2, in which case the dotted line position of the cross bar at 34' is indicative of the stroke of the hydraulic cylinder 28. Shifting to full line position (FIG. 2) permits the filled mold assembly 12' to be remove from apparatus 10 and an unfilled mold cylinder 60 of the new mold assembly 12' to receive the cheese C contents of the filling tube or chute 48.

A full appreciation of the present invention both in terms of the improved provolone cheese molding apparatus and the mold assemblies, therefore, may be had by reference to the sequence of operations illustrated schematically in FIGS. 4a–4f inclusive. FIG. 4a shows the apparatus and the mold assemblies essentially in the condition of FIG. 1. In the schematic representation, the slide 26 is shifted to its right-most position with respect to table 14 as viewed from the front of the apparatus, and, in that respect, tube or cylinder 60 is aligned with opening 44 within table 14. Hot or warm cheese C is pressed into that cylinder as indicated by arrow 84 to the extent of raising cap 62 to the extent where it contacts tube fixing plate 64 mounted to hydraulic cylinder 74'. In that respect, the hydraulic cylinder 74' has been actuated by supplying hydraulic fluid to the upper face of piston 82, depressing the piston and locking of the tube 60 against slide 26. To the left, the second tube 60 of mold assembly 12 is locked against the same slide 26 aligned with the opening 56 within the slide to the left of opening 56 through which cheese C enters tube 60 of mold assembly 12', this being achieved by extension of shaft 78 in the direction of arrow 86 forcing its tube fixing plate 64 to press against the upper end of tube 60 of assembly 12. This is achieved by applying hydraulic fluid under pressure against the upper face of piston 82 within hydraulic cylinder 74. Thus, both tubes 60 of respective assemblies 12 and 12' are under compressive force locking the tubes to the laterally shiftable slide 26. Subsequent to the cap 62 reaching its uppermost position as defined by the tube fixing plate 64, and this being visually apparent to the operator of the machine by contrasting the color of the cap 62 with the tube 60. Tube 60 is either transparent or translucent (as in the instant illustrated embodiment). The slide 26 is ready to shift to the right to present a new unfilled cylinder 60 of mold assembly 12 to the available cheese supply as defined by vertical chute or tube 48 fixed to the bottom of the table 14 and aligned with the table opening 44.

Figure 4B:
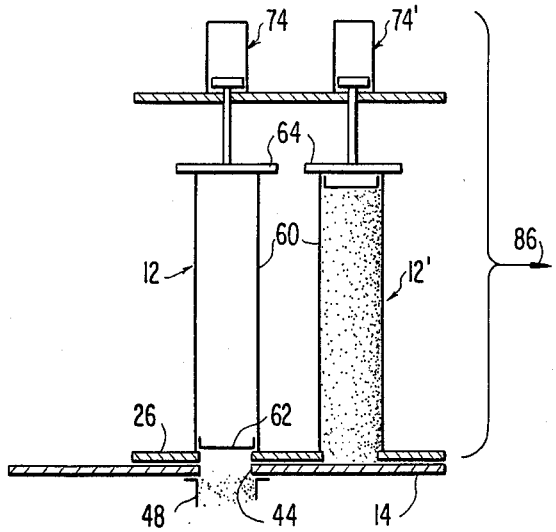

Turning to FIG. 4b, it may be seen that by suitable operation of hydraulic cylinder 28, the slide 26 is shifted from left to right, in which case the shaft or rod 32 of the hydraulic cylinder extends, forcing the cross bar 34 to shift from position 34 to position 34' (FIG. 2). This has the effect of severing that portion of the cheese C filling tube 60 of assembly 12' from the remaining portion of the cheese within the supply tube or chute 48. In actuality, the slide 26 is in surface contact with the table 14 as best seen in FIGS. 1 and 3 so that the cheese is effectively severed and provided with a smooth lower end by this action. Hydraulic pressure continues to be applied to the hydraulic cylinders 74 and 74', maintaining the tube fixing plate 64 against the upper ends of tubes 60 of respective assemblies 12 and 12'. The stroke of the hydraulic cylinder 28 is such that the tubes 60 of assembly 12' is now in axial alignment with opening 44 within plate 14 and chute 48. Preferably, the caps 62 of the given assemblies 12, 12', 12", etc. have a slight frictional fit with the tube 60 within which they are positioned, and when the tubes are mounted in position on slide 26, the caps prior to the introduction of cheese into the tubes 60 are at the bottom of those tubes and in the position of cap 62 for tube 60 for assembly 12 (FIG. 4b).

Figure 4C:
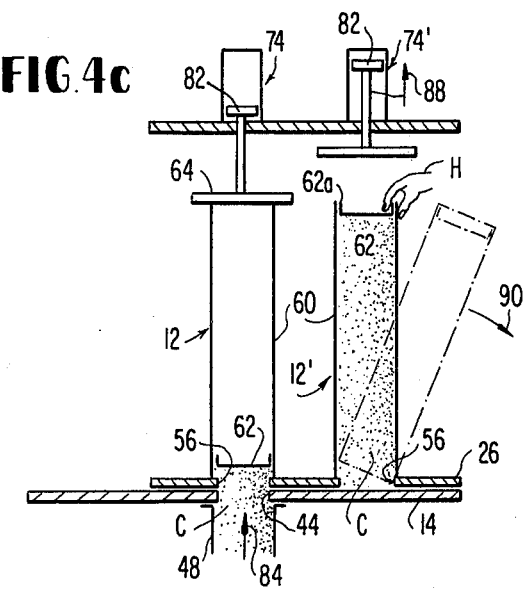
Figure 4D:
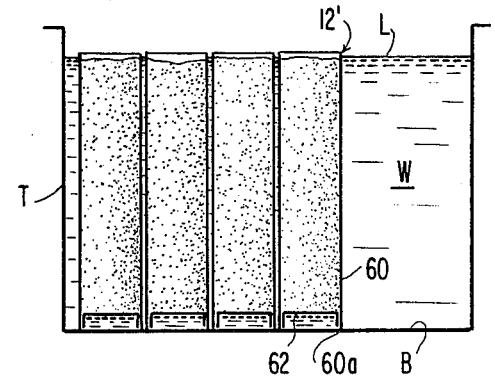

Turning next to FIG. 4c, it may be seen that simultaneously two actions occur at the time of alignment of tube 60 with the chute 48 and the opening 44 within table 14. Cheese C under pressure may be introduced to the tube, driving the cap 62 upwardly as indicated by arrow 84, with tube fixing plate 64 pressing the tube 60 downwardly against the slide 26. The hole 62c within the center of the cap 62 permits any air which would be otherwise captured between the cheese and the cap 62 to escape. The tube fixing plate may be relatively narrow and constitute a bar which does not completely cover the tube but which plate 64 in bar form is longer than the tube 60. Thus, air can readily escape through the open upper end of the tube 60 during cheese entry into the same. As the cap 62 of contrasting color and seen through the light transmissive tube 60 rises, the filled tube 60 and its cap 62 of mold assembly 12' can be removed by the machine operator. This is achieved by supplying hydraulic fluid under pressure through the lowermost fitting 79 by way of tube 80 to hydraulic cylinder 74' and permitting hydraulic fluid to be removed from the cylinder above piston 82 of that element through the uppermost fitting 79 and hose or tubing 80 of hydraulic cylinder 74'. This takes place as indicated by arrow 88, causing the tube fixing plate 64 to rise, being projected upwardly by retraction of shaft 88 fixed to the upwardly moving piston 82. This permits the operator, whose hand is shown at capital H, to grasp tube 60 at its upper end and simultaneously the side wall 62a of cap 62. The mold assembly 12' can be tilted to the right as shown by the arrow 90 to an oblique or inclined position. The operator continuing to tilt the assembly 12' until it in fact is inverted as indicated in FIG. 4d, and the operator deposits the assembly 12' in vertical position adjacent the other mold assemblies filled with cheese. The cap 62 and the previous upper edge 60a is in contact with the bottom B of the tank T bearing a coolant such as water W as indicated with water filling the interior of the hollow cap. The level L of water is preferably at least as high as the inverted mold assemblies received within the tank T.

Figure 4E:
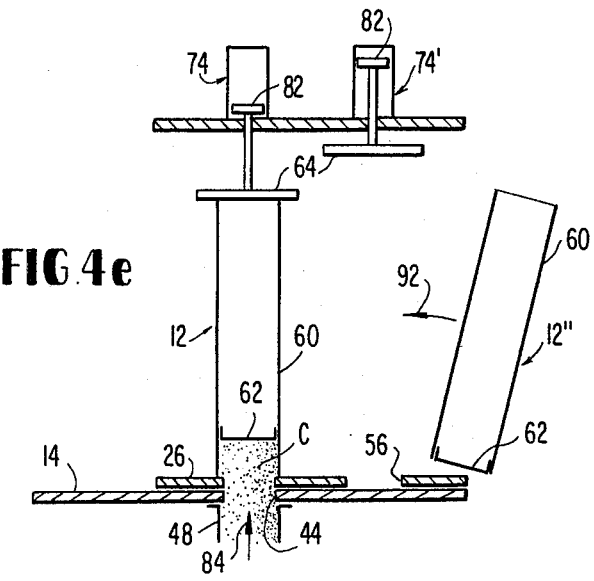
Figure 4F:
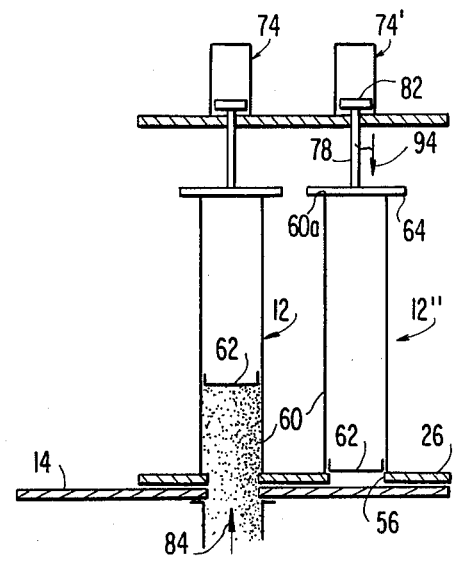

Referring next to FIG. 4e, while the cylinder or tube 60 of mold assembly 12 is receiving cheese C and while the cap or plunger 62 is rising by being forced upwardly by the incoming cheese as indicated at 84, a new empty mold assembly 12" is supplied to the apparatus in place of the filled and removed mold assembly 12'. It is introduced and positioned in reverse manner to the removal of assembly 12' as per FIG. 4c. In that respect, arrow 92 indicates the nature of the insertion of the mold assembly 12", that mold assembly being comprised again of an empty cylinder or tube 60, bearing at its lower end a cap 62. Once positioned in axial alignment with the rightmost opening 56 within slide 26 and in vertical alignment with the hydraulic cylinder 74', operation of the hydraulic cylinder 74' may be effected as per FIG. 4f by the application of hydraulic fluid under pressure against the upper surface of piston 82 forcing shaft 78 to extend, driving the tube fixing plate 64 downwardly against the upper end of the tube 60 to lock tube 60 in position.

Subsequent to the complete filling of tube 60 of assembly 12 to the extent where its cap 62 impacts against the tube fixing plate 64, easily ascertained by visual inspection by the operator due to the light transmissive nature of tube 60, the assembly 12 is ready to be removed in the nature of the prior filled assembly 12' (FIG. 4c), this being achieved by operation of hydraulic cylinder 28 which shifts the plate 26 from right to left, in which case the stroke of the hydraulic cylinder automatically axially locates the unfilled mold assembly 12" over the hole or opening 44 within table 14 and ready to receive its charge of hot provolone cheese.

Operation continues simply by alternating the position of the slide 26, removal of filled mold assemblies and replacement of the same by unfilled ones in the manner easily appreciated by reference to the sequence of operations from FIGS. 4a-4f inclusive. From the above, it may be appreciated that a single operator can operate the apparatus of the present invention. The cylindrical loaves of cheese are uniform in terms of content and weight and the ends of the same are flat due to the action of the cup-shaped plunger or cap and the cutoff of the filled cylinder by shift of the slide relative to the smooth table with which it contacts. The utilization of hydraulic cylinders to control the tube fixing or locking plates 64 permits the assembly to be rigidified during transverse shifting of the slide 26. Simply removing the plate 64 from the upper ends of the cylinder 60 permits grasping and removal of a filled mold assembly and the replacement of an unfilled one. In addition, because the plunger or cap is cup-shaped, the operator may easily reach up, grasp the top of the tube with the fingers inside the plunger, and the contents may be readily inverted to eliminate the problem of cheese tending to run out of the tubes employed during the molding process. Further, because the plunger is hollow to the extent that it is cup-shaped, when the tube and plunger are inserted within the bath of water W, a certain amount of cold water W is captured within the interior of the cap or plunger and acts to assist in cooling that end of the tube insofar as the cheese is concerned. Further, the plunger or cap may function to assist forcing the cheese out of the tube after it is cooled by manual operation. Finally, since the plunger has a hole in its center, this permits the air to escape as the cheese forces the plunger to rise upwardly so as to provide uniformity to the cheese itself throughout the extent of the loaf being formed during this process.

While the invention has been particularly shown and described with reference to a preferred embodiment thereof, it will be understood by those skilled in the art that various changes in form and details may be made therein without departing from the spirit and scope of the invention.

What is claimed is:

1. In combination, an improved provolone cheese molding apparatus and mold assemblies therefor, said apparatus comprising:
   a fixed, horizontal table;
   a circular hole within said table;
   a chute depending from said table aligned with said opening;
   means for pressing warm cheese upwardly within said chute for discharge vertically upwards from said opening;

a slide mounted on said table for horizontal reciprocating movement over the top of the table;

a longitudinally spaced row of circular holes within said slide for selective alignment with the hole of said table as said slide is shifted transversely relative to said table; and cheese loaf forming tubes vertically mounted on said slide coaxial with said holes and extending upwardly therefrom for receiving said cheese through said table opening to form cylindrical loaves conforming to the tube interior, the improvement wherein:

said table is provided with a single circular hole;

said tubes are formed of a lightweight light transmitting material, each tube including a disc-like plunger of light contrasting color to that of said tube, having a diameter on the order of the inner diameter of said tube and slidably positioned therein, and said apparatus further comprises:

means for releasably clamping the tubes downwardly against the slide and in vertical alignment with the holes within said slide during tube filling and lateral shifting of said slide, whereby said tubes are sequentially filled with hot cheese through the open bottoms of said tubes, forcing the plungers to rise within the tube to visually indicate to the operator the level of the cheese within the tube and wherein, by release of the releasable clamping means, a filled tube may be removed from the apparatus subsequent to shifting of the slide position where the table cuts off the bottom of a filled tube from the cheese supply.

2. The apparatus as claimed in claim 1 wherein said tube and plunger are formed of translucent plastic of contrasting color.

3. The apparatus as claimed in claim 1 wherein said plunger comprises a cup-shaped cap including a cylindrical side wall projecting upwardly such that the tube is grasped by insertion of the fingers within the cavity defined by the bottom of the cap and the side wall thereof to facilitate removal of the filled tube from the slide subsequent to release of said releasable clamping, and for insuring cooling liquid contact to the cheese in contact with the bottom wall of the cap subsequent to inversion of the filled tube, and depositing of the same within a cooling tank filled with cooling liquid.

4. The apparatus as claimed in claim 1 wherein said means for releasably clamping said tube downwardly against said slide comprises hydraulic cylinders fixedly mounted with respect to said horizontal slide and overlying the same and being aligned with respective holes within said slide, and further comprising horizontal tube fixing plates fixed to the ends of extensible rods projecting outwardly of said hydraulic cylinder and downwardly towards said slide, with said tube fixing plates having a length in excess of the diameter of the tubes so as to engage the upper end of said tubes and press said tubes against said slide, adjacent to the openings and in axial alignment therewith.

5. The apparatus as claimed in claim 2 wherein said means for releasably clamping said tube downwardly against said slide comprises hydraulic cylinders fixedly mounted with respect to said horizontal slide and overlying the same and being aligned with respective holes within said slide, and further comprising horizontal tube fixing plates fixed to the ends of extensible rods projecting outwardly of said hydraulic cylinder and downwardly towards said slide, with said tube fixing plates having a length in excess of the diameter of the tubes so as to engage the upper end of said tubes and press said tubes against said slide, adjacent to the openings and in axial alignment therewith.

6. The apparatus as claimed in claim 3 wherein said means for releasably clamping said tube downwardly against said slide comprises hydraulic cylinders fixedly mounted with respect to said horizontal slide and overlying the same and being aligned with respective holes within said slide, and further comprising horizontal tube fixing plates fixed to the ends of extensible rods projecting outwardly of said hydraulic cylinder and downwardly towards said slide, with said tube fixing plates having a length in excess of the diameter of the tubes so as to engage the upper end of said tubes and press said tubes against said slide, adjacent to the openings and in axial alignment therewith.

7. The apparatus as claimed in claim 4 wherein a plurality of support rods are vertically mounted on said slide and project upwardly therefrom, and a tube locking head is slidably mounted on said rods for vertical shifting with respect to said slide, and collars concentrically mounted on said rods are fixedly mounted to said tube locking heads, with said collars carrying locking screws for frictionally locking said collars to said rods to permit said hydraulic cylinders to be located such that, upon extension of the rods bearing the tube fixing plates, said tubes are sandwiched between the tube fixing plates and said slide.

8. A mold assembly for use in a provolone cheese molding apparatus, said apparatus comprising:

a horizontal table;

a circular hole within said table;

a chute depending from said table and being aligned with said opening;

means for pressing cheese upwardly through said chute for discharge vertically upwards from table opening;

a slide mounted on said table for horizontal reciprocating movement over the top of said table and bearing a row of longitudinally spaced circular holes within said slide for selective alignment with the hole within said table as said slide is shifted transversely relative to said table, said mold assembly comprising;

means for releasably clamping said mold assembly in axially aligned positions with respective opening within said slide, said mold assemblies each comprising an open-ended tube formed of lightweight light transmitting material and a disc-shaped plunger of light contrasting color having a diameter on the order of the inner diameter of said tube and being slidably mounted therein such that said cheese, in moving upwardly through the aligned openings of said slide and said table and entering the interior of said light transmitting material tube, causes said plunger to visually indicate to the operator the extent of cheese accumulation within said tube such that said operator can terminate the delivery of cheese into the tube when the plunger contacts said releasable clamping means, and said slide can be shifted transversely to cut off the cheese accumulated within said tube from the cheese supply and to permit, by release of said releasable clamping means, removal of a filled tube and its plunger for movement for placement in a cooling bath to solidify the same.

9. The mold assembly as claimed in claim 8 wherein said tube is formed of translucent plastic, with said plunger being formed of a contrasting color.

10. The mold assembly as claimed in claim 9 wherein said plunger comprises a cup-shaped cap including a cylindrical side wall and a transverse bottom wall, and wherein said bottom wall includes an opening within the same for release of air trapped between the bottom wall of the plunger cap and the cheese entering said tube, and wherein the filled mold assembly can be removed by grasping the tube with the fingers entering the cavity formed by the side wall of the cap to facilitate lifting of a cheese filled mold assembly from the molding apparatus and inversion of the same and placement within a cooling liquid while permitting cooling liquid to move into contact with the bottom wall of the cap and fill the cavity defined by the side wall of the cap.

* * * * *